(12) United States Patent
Dodge et al.

(10) Patent No.: US 8,544,013 B2
(45) Date of Patent: Sep. 24, 2013

(54) PROCESS SCHEDULER HAVING MULTIPLE ADAPTIVE PARTITIONS ASSOCIATED WITH PROCESS THREADS ACCESSING MUTEXES AND THE LIKE

(75) Inventors: Dan Dodge, Nepean (CA); Attilla Danko, Ottawa (CA); Sebastien Marineau-Mes, Ottawa (CA); Peter van der Veen, Ottawa (CA); Colin Burgess, Ottawa (CA); Thomas Fletcher, Ottawa (CA); Brian Stecher, Kanata (CA)

(73) Assignee: QNX Software Systems Limited, Kanata, Ontario (CA)

( * ) Notice: Subject to any disclaimer, the term of this patent is extended or adjusted under 35 U.S.C. 154(b) by 1563 days.

(21) Appl. No.: 11/371,639

(22) Filed: Mar. 8, 2006

(65) Prior Publication Data
US 2007/0061809 A1 Mar. 15, 2007

Related U.S. Application Data

(60) Division of application No. 11/317,468, filed on Dec. 22, 2005, which is a continuation-in-part of application No. 11/216,795, filed on Aug. 31, 2005.

(60) Provisional application No. 60/662,070, filed on Mar. 14, 2005.

(51) Int. Cl.
*G06F 9/46* (2006.01)

(52) U.S. Cl.
USPC ............ 718/103; 718/102; 718/104; 718/108

(58) Field of Classification Search
USPC .......................................... 718/100, 102, 104
See application file for complete search history.

(56) References Cited

U.S. PATENT DOCUMENTS

| | | | |
|---|---|---|---|
| 4,908,750 A | 3/1990 | Jablow | |
| 5,068,778 A | 11/1991 | Kosem et al. | |

(Continued)

FOREIGN PATENT DOCUMENTS

| WO | WO 03/052597 A2 | 6/2003 |
|---|---|---|
| WO | WO 2004/019205 A2 | 3/2004 |

OTHER PUBLICATIONS

Krten, Rob, "Getting Started with QNX 4: A Guide for Realtime Programmers," PARSE Software Devices, 1999, pp. 13-24.

(Continued)

*Primary Examiner* — Meng An
*Assistant Examiner* — Tammy Lee
(74) *Attorney, Agent, or Firm* — Brinks Hofer Gilson & Lione

(57) ABSTRACT

A system is set forth that includes a processor, one or more memory storage units, and software code stored in the one or more memory storage units. The software code is executable by the processor to generate a plurality of adaptive partitions that are each associated with one or more process threads. Each of the plurality of adaptive partitions has a corresponding processor budget that is assigned to it. The process threads include a mutex holding thread and a mutex waiting thread. The mutex holding thread is associated with a first adaptive partition and may gain exclusive access to a mutex object. The mutex waiting thread is associated with a second adaptive partition and must wait for access to the mutex object while the mutex object is held by the mutex holding thread. The software code further includes a scheduling system that selectively allocates the processor to run the process threads based, at least in part, on the processor budget of the associated adaptive partitions. The scheduling system bills processor allocation used to run the mutex holding thread to the processor budget of the second adaptive partition when the processor budget of the first adaptive partition has been exhausted.

21 Claims, 11 Drawing Sheets

(56) References Cited

U.S. PATENT DOCUMENTS

| | | | |
|---|---|---|---|
| 5,530,860 A | 6/1996 | Matsuura | |
| 5,745,778 A | 4/1998 | Alfieri | |
| 5,812,844 A * | 9/1998 | Jones et al. | 718/104 |
| 5,845,116 A | 12/1998 | Saito et al. | |
| 5,912,888 A | 6/1999 | Walsh et al. | |
| 5,944,778 A * | 8/1999 | Takeuchi et al. | 718/100 |
| 6,003,061 A | 12/1999 | Jones et al. | |
| 6,108,646 A | 8/2000 | Mohri et al. | |
| 6,249,836 B1 | 6/2001 | Downs et al. | |
| 6,301,616 B1 | 10/2001 | Pal et al. | |
| 6,385,636 B1 | 5/2002 | Suzuki | |
| 6,415,333 B1 | 7/2002 | Vasell | |
| 6,560,628 B1 * | 5/2003 | Murata | 718/103 |
| 6,687,904 B1 * | 2/2004 | Gomes et al. | 718/102 |
| 6,754,690 B2 * | 6/2004 | Larson | 718/102 |
| 6,757,897 B1 | 6/2004 | Shi et al. | |
| 6,785,889 B1 | 8/2004 | Williams | |
| 6,859,926 B1 * | 2/2005 | Brenner et al. | 718/100 |
| 6,874,144 B1 * | 3/2005 | Kush | 718/103 |
| 6,910,213 B1 | 6/2005 | Hirono et al. | |
| 6,948,172 B1 | 9/2005 | D'Souza | |
| 6,950,848 B1 | 9/2005 | Yousefi'zadeh | |
| 6,957,431 B2 * | 10/2005 | Bollella et al. | 718/100 |
| 6,957,435 B2 * | 10/2005 | Armstrong et al. | 718/104 |
| 6,988,226 B2 | 1/2006 | Koning et al. | |
| 7,051,329 B1 | 5/2006 | Boggs et al. | |
| 7,058,951 B2 * | 6/2006 | Bril et al. | 718/104 |
| 7,086,057 B2 * | 8/2006 | Hayashi | 718/102 |
| 7,100,161 B2 * | 8/2006 | Latour | 718/102 |
| 7,117,497 B2 * | 10/2006 | Miller et al. | 718/102 |
| 7,134,124 B2 | 11/2006 | Ohsawa et al. | |
| 7,222,343 B2 | 5/2007 | Heyrman et al. | |
| 7,302,685 B2 * | 11/2007 | Binns et al. | 718/103 |
| 7,380,039 B2 | 5/2008 | Miloushev et al. | |
| 7,383,548 B2 | 6/2008 | Boon et al. | |
| 7,406,522 B2 * | 7/2008 | Riddle | 709/226 |
| 7,421,691 B1 | 9/2008 | Hancock et al. | |
| 7,458,076 B2 * | 11/2008 | Swanberg et al. | 718/100 |
| 7,464,379 B2 | 12/2008 | Kanai et al. | |
| 7,472,389 B2 * | 12/2008 | Smith et al. | 718/102 |
| 7,475,399 B2 | 1/2009 | Arimilli et al. | |
| 7,506,361 B2 | 3/2009 | Kegel et al. | |
| 7,512,950 B1 | 3/2009 | Marejka | |
| 7,562,362 B1 | 7/2009 | Paquette et al. | |
| 7,657,892 B2 | 2/2010 | Langen et al. | |
| 7,765,547 B2 * | 7/2010 | Cismas et al. | 718/100 |
| 2002/0062435 A1 | 5/2002 | Nemirovsky et al. | |
| 2002/0078121 A1 * | 6/2002 | Ballantyne | 709/102 |
| 2002/0078194 A1 | 6/2002 | Neti et al. | |
| 2002/0083211 A1 | 6/2002 | Driesner et al. | |
| 2002/0120661 A1 | 8/2002 | Binns et al. | |
| 2002/0120665 A1 | 8/2002 | Alford et al. | |
| 2002/0178208 A1 | 11/2002 | Hutchinson et al. | |
| 2002/0194251 A1 * | 12/2002 | Richter et al. | 709/105 |
| 2003/0041090 A1 * | 2/2003 | Armstrong et al. | 709/106 |
| 2003/0061260 A1 | 3/2003 | Rajkumar et al. | |
| 2003/0069917 A1 * | 4/2003 | Miller | 709/105 |
| 2003/0084164 A1 | 5/2003 | Mazzitelli | 709/227 |
| 2003/0088606 A1 | 5/2003 | Miller et al. | |
| 2003/0158884 A1 * | 8/2003 | Alford, Jr. | 709/104 |
| 2004/0143664 A1 | 7/2004 | Usa et al. | |
| 2004/0186904 A1 | 9/2004 | Oliveira | |
| 2004/0216101 A1 | 10/2004 | Burky et al. | |
| 2004/0216113 A1 | 10/2004 | Armstrong et al. | |
| 2004/0226015 A1 | 11/2004 | Leonard et al. | |
| 2005/0004879 A1 | 1/2005 | Mathias et al. | |
| 2005/0010502 A1 | 1/2005 | Birkestrand et al. | |
| 2005/0081214 A1 | 4/2005 | Nemirovsky et al. | |
| 2005/0091387 A1 | 4/2005 | Abe | 709/228 |
| 2005/0125789 A1 * | 6/2005 | Dijkstra et al. | 718/100 |
| 2005/0210468 A1 | 9/2005 | Chung et al. | |
| 2005/0283785 A1 | 12/2005 | D'Souza | |
| 2006/0026594 A1 | 2/2006 | Yoshida et al. | |
| 2006/0080285 A1 | 4/2006 | Chowdhuri | |
| 2006/0101224 A1 * | 5/2006 | Shah et al. | 711/173 |
| 2006/0117316 A1 | 6/2006 | Cismas et al. | 718/103 |
| 2006/0130062 A1 * | 6/2006 | Burdick et al. | 718/100 |
| 2006/0143350 A1 | 6/2006 | Miloushev et al. | |
| 2006/0206881 A1 | 9/2006 | Dodge et al. | |
| 2006/0206887 A1 | 9/2006 | Dodge et al. | |
| 2006/0206891 A1 | 9/2006 | Armstrong et al. | |
| 2006/0212870 A1 | 9/2006 | Arndt et al. | |
| 2006/0218557 A1 | 9/2006 | Garthwaite et al. | |
| 2006/0225077 A1 | 10/2006 | Anderson | |
| 2006/0277551 A1 | 12/2006 | Accapadi et al. | |
| 2007/0061788 A1 | 3/2007 | Dodge et al. | |
| 2007/0226739 A1 | 9/2007 | Dodge et al. | |
| 2007/0271562 A1 | 11/2007 | Schumacher et al. | |
| 2008/0126547 A1 | 5/2008 | Waldspurger | |
| 2008/0196031 A1 | 8/2008 | Danko | |
| 2008/0235701 A1 | 9/2008 | Danko | |
| 2008/0307425 A1 | 12/2008 | Tripathi | 718/104 |

OTHER PUBLICATIONS

"QNX Operating System: System Architecture," QNX Software Systems, Ltd., 1997, pp. 37-47.

Shen, Kai et al. "Integrated Resource Management for Cluster-based Internet Services," ACM SIGOPS Operating Systems Review, 2002, 14 pgs.

* cited by examiner

PROCESS SCHEDULER HAVING MULTIPLE ADAPTIVE PARTITIONS ASSOCIATED WITH PROCESS THREADS ACCESSING MUTEXES AND THE LIKE

PRIORITY CLAIM

This application claims the benefit of priority from U.S. Provisional Application No. 60/662,070, filed Mar. 14, 2005, which is incorporated herein by reference. This application is also a divisional of U.S. patent application Ser. No. 11/317,468, filed Dec. 22, 2005, which is a continuation-in-part of U.S. patent application Ser. No. 11/216,795, filed Aug. 31, 2005, both of which are also incorporated herein by reference.

BACKGROUND OF THE INVENTION

1. Technical Field

The present invention is directed to a manner in which a processing system schedules the running of threads and the like. More particularly, the invention is directed to a system having adaptive partition scheduling for process threads where the process threads access mutexes and the like.

2. Related Art

The kernel of an operating system should be capable of dividing up CPU resources so that each thread that is active in the system obtains an adequate amount of CPU time to properly execute the corresponding process. To this end, the kernel may implement a scheduling system that determines how the available CPU time is allocated between multiple threads.

There are at least three types of process scheduling systems: a FIFO scheduling system; a round-robin scheduling system; and a sporadic scheduling system. In each system, a priority value is assigned to each thread of a process that is executed by the CPU. High priority values are assigned to threads that may be important to the operation of the overall system while threads that may be less important to the operation of the system have lower priority values. Whether the scheduling system gives a thread access to the CPU also depends on the state of the thread. For example, a thread may be ready or blocked (although other states also may be used). A thread is ready when it is capable of being executed in that all conditions needed for it to run have been met. In contrast, a thread is blocked when it tries to initiate an operation that cannot be completed immediately and must wait for the completion of some event before execution of the thread may continue.

In a FIFO scheduling system, the currently executing thread continues to use all of the CPU time until it gives up the CPU by blocking, it finishes execution, or it is preempted by a higher priority thread. Once one of these criterion are met, the FIFO scheduling system allocates the CPU to the highest priority process/thread that is in a ready state. Generally, there is one ready queue for each priority level.

A round-robin scheduling system uses an additional parameter, a timeslice, to allocate CPU time to a thread. A timeslice is an amount of time during which a thread is allowed to access the CPU. In a round-robin scheduling system, the currently executing thread continues to use all of the CPU time until the occurrence of one of the following events: 1) the currently executing process blocks; 2) the currently executing process finishes; 3) the currently executing process is preempted by a higher priority thread; or 4) the currently executing process uses up its timeslice. Once the currently executing process blocks or uses up its timeslice, it is put at the back of the ready queue for its priority level.

Sporadic scheduling is somewhat similar to round-robin scheduling. In a sporadic scheduling system, the currently executing process continues to use all of the CPU time until the occurrence of one of the following events: 1) the currently executing process blocks; 2) the currently executing process finishes; 3) the currently executing process is preempted by a higher priority thread; or 4) the currently executing process uses up a capped limit on the execution time assigned to the thread within a given period of time. The capped limit is known as a budget, while the given period of time in which this budget may be used is known as the replenishment period. In operation, the budget for a thread is replenished upon expiration of the replenishment period. Once the currently executing process blocks, it is put at the back of the ready queue for its priority level. However, if the currently executing process uses up its budget within the replenishment period, its priority level is reduced by a predetermined value and it is placed at the back of the ready queue for this lower priority level. The priority level of the process/thread may be returned to its original value in response to a number of different conditions.

In certain operating systems, such as those available from QNX Software Systems in Kanata, Ontario, each thread in the system may run using any of the foregoing scheduling systems. Consequently, the scheduling systems are effective on a per-thread basis for all threads and processes on a node. Each thread is assigned to a particular scheduling system type through the operation of the process/thread itself. This provides the software designer with a significant degree of design flexibility, but also involves a need for coordination between software designers implementing code for the same system. This coordination includes the assignment of priorities to the different threads as well as the scheduling system type assigned to each thread.

Some available operating systems apply scheduling on a global basis. One such global scheduling system is known as fair-share scheduling. In a fair-share scheduling system, CPU usage may be equally distributed among system users, groups, or processes. For example, if four users (A,B,C,D) are concurrently executing one process each, the fair-share scheduler will logically divide the available CPU cycles such that each user gets 25% of the whole (100%/4=25%). If user B starts a second process, each user will still receive 25% of the total cycles, but both of user B's processes will each receive 12.5% of the total available CPU time. On the other hand, if a new user starts a process on the system, the scheduler will reapportion the available CPU cycles such that each user gets 20% of the whole (100%/5=20%).

Another layer of abstraction allows partitioning of users into groups, and application of the fair share system to the groups as well. In this case, the available CPU cycles are divided first among the groups, then among the users within the groups, and then among the processes for that user. For example, if there are three groups (1,2,3) containing three, two, and four users respectively, the available CPU cycles may be distributed as follows: 100%/3 groups=33.3% per group Group 1: (33.3%/3 users)=11.1% per user Group 2: (33.3%/2 users)=16.7% per user Group 3: (33.3%/4 users)=8.3% per user. Other percentage distributions among the groups also may be used.

One manner of logically implementing fair-share scheduling strategy is to recursively apply a round-robin scheduling strategy at each level of abstraction (processes, users, groups, etc.). In round robin scheduling, threads of equal importance or priority take turns running. They each run for intervals, or timeslices, that are the property of each thread or group of threads.

While the foregoing scheduling systems have advantages in different applications, they may experience deficiencies when used in certain system applications. For example, when per-thread scheduling systems are used in real-time systems where the latencies of a process/thread have been planned solely through the assignment of priority levels, very long latencies for low-priority threads may occur. Malicious software processes may configure themselves for high priority execution and thereby preempt proper scheduling of lower priority threads. This problem also may occur, for example, during system development when a high priority thread malfunctions and enters an infinite loop. Global fair-share scheduling systems may avoid such problems, but lack the responsiveness needed for use in a real-time system. Therefore, a need exists for a scheduling system that may effectively allow high-priority threads to operate on a real-time basis while concurrently providing some sort of fair-share CPU access to all threads.

SUMMARY

A system is set forth that includes a processor, one or more memory storage units, and software code stored in the one or more memory storage units. The software code is executable by the processor to generate a plurality of adaptive partitions that are each associated with one or more process threads. Each of the plurality of adaptive partitions has a corresponding processor budget that is assigned to it. The process threads include a mutex holding thread and a mutex waiting thread. The mutex holding thread is associated with a first adaptive partition and may gain exclusive access to a mutex object. The mutex waiting thread is associated with a second adaptive partition and must wait for access to the mutex object while the mutex object is held by the mutex holding thread. The software code further includes a scheduling system that selectively allocates the processor to run the process threads based, at least in part, on the processor budget of the associated adaptive partitions. The scheduling system bills processor allocation used to run the mutex holding thread to the processor budget of the second adaptive partition when the processor budget of the first adaptive partition has been exhausted.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
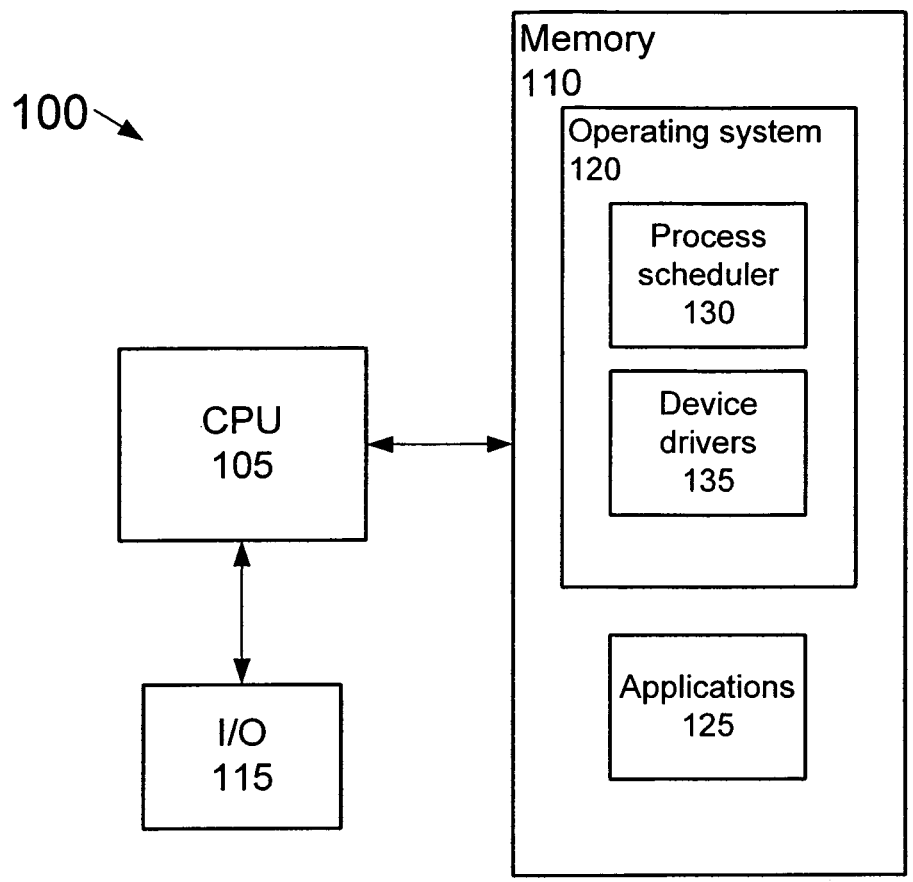
FIG. 1 is a schematic block diagram of one embodiment of a system that may execute a process scheduler in accordance with the teachings of the present invention.

FIG. 1 is a schematic block diagram of a system 100 that may execute a process scheduler employing an adaptive partitioning of process threads. System 100 includes a central processing unit 105 ("CPU") that may access software code stored in memory 110. CPU 105 also may be disposed to access various devices/system components through an I/O interface 115. The devices/system components may include, for example, sensors, human interface devices, network nodes, printers, storage devices, or the like. The processors in a symmetric multiprocessing system, regardless of the number, may be considered in the same manner as a single processor and are likewise included in the scope of the representation by block 105.

Memory 110 may be used to store, among other things, the software code that defines the functions that are to be executed by the system 100. Although memory 110 is shown as a single unit, it may be implemented as multiple memory units of the same or different memory type. For example, memory 110 may be implemented with multiple flash memory devices. Alternatively, or in addition, memory 110 may be implemented with one or more flash memory devices and one or more hard disc storage devices. It will be recognized that a substantial number of alternative memory device combinations may be used to implement memory 110.

Some of the software code that may be stored in memory 110 and executed by CPU 105 is identified in FIG. 1. The identified software code shown here includes an operating system 120 and one or more software applications 125. In this example, a process scheduler 130 and device drivers 135 are included as members of the operating system 120. The process scheduler 130 and device drivers 135, however, also may be implemented as software modules that are separate from the operating system 120. Software applications 125 may be used to define the high-level functions that system 100 is to perform. Device drivers 135 may be used to provide a hardware abstraction layer through which software applications 125 communicate with the hardware components of the system 100. The hardware components may include the components accessed through I/O interface 115.

Process scheduler 130 comprises the executable software code that is used to allocate the processing time of the CPU 105 ("CPU time") to each thread of the system 100. The CPU time may be allocated so that each thread obtains an adequate amount of CPU time to properly execute the corresponding process.

Figure 2:
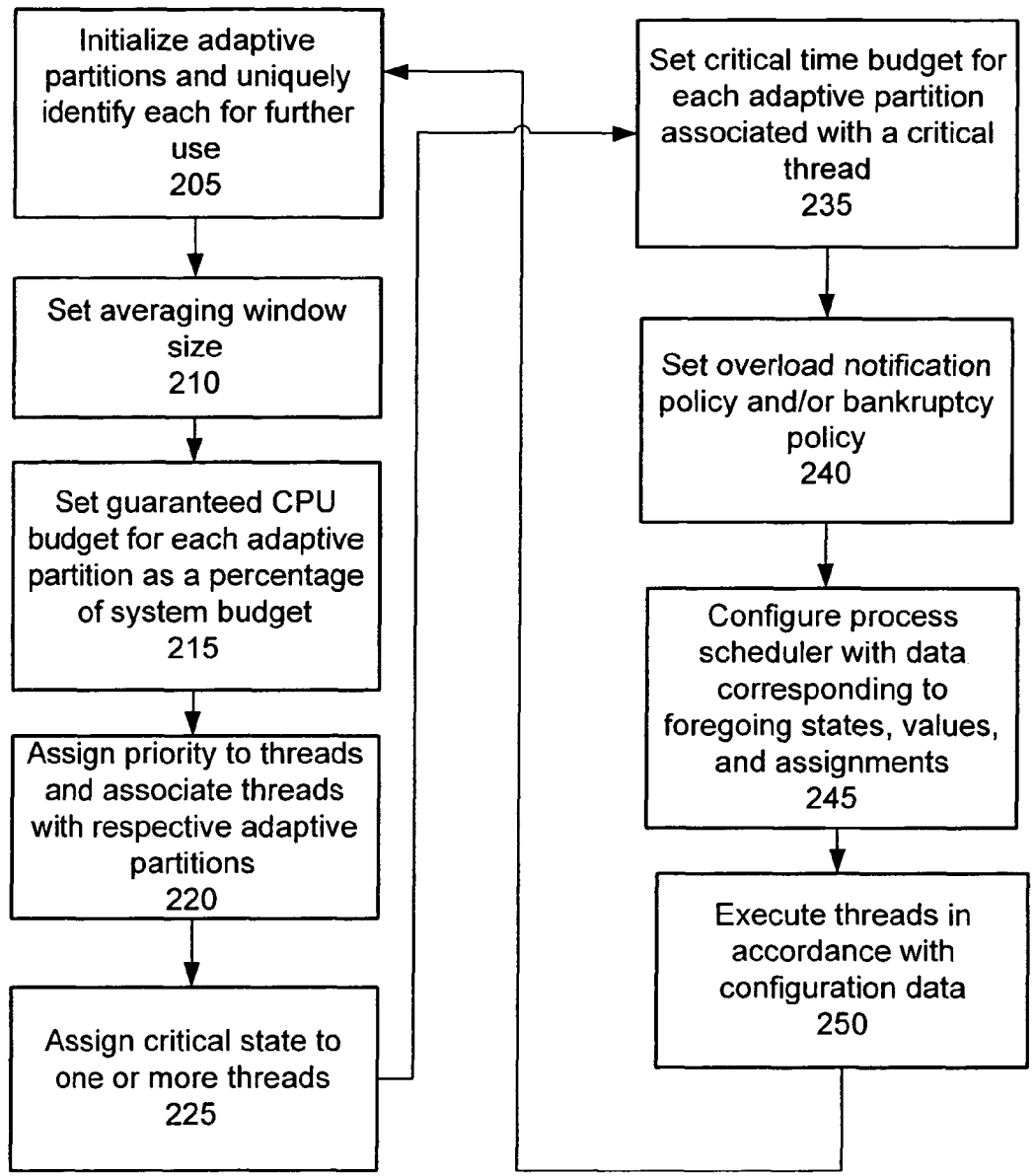
FIG. 2 is a diagram illustrating a number of different interrelated processes that may be used to set up a process scheduler that employs adaptive partitions.

FIG. 2 is a flow chart showing a number of interrelated operations that may be used to implement the process scheduler 130. The flow chart of FIG. 2 illustrates many of the values and operational characteristics used in the process scheduler 130. Some values or operational characteristics may be fixed as a result of user choices during the design process, while other values or operational characteristics are provided through configuration data provided by a user and/or through software programming of the system 100.

As shown, the process scheduler 130 creates a number of different adaptive partitions at block 205. Each adaptive partition constitutes a virtual container for scheduling attributes associated with a set of process threads that have been grouped together by the process scheduler 130. Threads that work toward a common or related function may be assigned to the same adaptive partition. In object-oriented systems, the adaptive partitions may be generated as instances of an adaptive partition class that includes corresponding scheduling methods and attributes. Each of the adaptive partitions generated at block 205 is uniquely identified for further access by the process scheduler 130.

The number of partitions generated by the process scheduler 130 may be initiated through the use of configuration parameters. The configuration data may be provided by user initiated commands or through programs that interface with the process scheduler 130.

At block 210, the size of the averaging window that will be used by the process scheduler 130 is calculated. As will be set forth in further detail below, the averaging window is the time over which the process scheduler 130 attempts to keep adaptive partitions at their guaranteed CPU percentages when the system is overloaded. A typical time is 100 milliseconds, though other averaging window sizes may be appropriate. The averaging window size may be specified at boot time, and may be respecified any time thereafter as well. Considerations in choosing the size of the averaging window may include:

- A short duration averaging window size reduces the accuracy of CPU time-balancing.
- When a short duration averaging window is used, partitions that exhaust their budgets because other partitions are using less than their guaranteed percentage may not have to pay the time back.
- In some instances, a long duration averaging window size may cause some adaptive partitions to experience runtime delays.

The size of the averaging window ("windowsize") may be assigned in terms of milliseconds, which the scheduling process 130 converts to clock ticks. A clock tick is the interval between clock interrupts (the system timer). All of the time budgets used by the scheduling process 130 may be averaged over the same windowsize.

At block 215, the scheduling process 130 assigns a guaranteed CPU time budget to each adaptive partition. The guaranteed budget may be assigned as a percentage of the overall available system budget. The sum of all adaptive partitions' CPU percentages in such instances will be 100%. For the purpose of assigning shares of the overall CPU time budget, the processors in a symmetric multiprocessing system, regardless of the number, may be considered in the same manner as a single processor.

The guaranteed budget used for each adaptive partition may be determined in a number of different manners. For example, the CPU time used by each partition under several different load conditions may be measured and then used to construct a graph of load versus CPU time consumed by each partition. Measurements also may be made under overload conditions. This information may be used to balance the needs of the various threads contained in each partition under the various conditions and assign the appropriate guaranteed CPU time budgets. The measurements also may be used to dynamically vary the guaranteed CPU time budgets with respect to CPU load conditions. For example, the process scheduler 130 may operate in accordance with different operating modes in response to different operating conditions. While operating in a particular mode, the process scheduler 130 employs a unique set of adaptive partition parameters. The availability and parameters associated with a particular mode may be specified at boot time. An application programming interface ("API") at run-time may be used to switch modes as needed. For example, a first set of guaranteed CPU time percentages may be employed during startup while a second set of guaranteed CPU time percentages may be employed during normal operations after system startup has been completed.

A priority is assigned to each thread and each thread is associated with a respective adaptive partition at block 220. Functionally-related software may be assigned to the same adaptive partition. This effects a hybrid process scheduling system in which the priority assigned to a thread as well as the guaranteed CPU time percentages of the adaptive partitions are used in the scheduling decisions executed by the process scheduler 130.

In assigning the threads to respective adaptive partitions, adaptive partition scheduling may be used as a structured way of deciding when the running of a particular function of the system will be inhibited. When used in this manner, separate threads may be placed into different adaptive partitions based on whether the threads should be starved of CPU time under a particular set of circumstances. For example, suppose the system 100 is designed to operate as a packet router. Some of the processes that may be executed by a packet router include 1) routing packets, 2) collecting and logging statistics for packet routing, 3) route-topology protocols with peer routers, and 4) collecting logging and route-topology metrics. In such instances, the threads of these processes may be assigned to two adaptive partitions: one for threads associated with routing and one for threads associated with the topology of the network. When the system is overloaded (i.e., there is more outstanding work than the machine may possibly accomplish), there may be a need to determine which applications are to be run slower. To this end, it may be preferable to route packets as opposed to collecting routing metrics if the CPU does not have enough resources to execute threads for both routing and metrics. It also may be reasonable to run the threads associated with network topology protocols, even when CPU resources are limited. Under these circumstances, it may be preferable to employ three adaptive partitions as opposed to the two adaptive partitions initially considered. The three adaptive partitions, along with exemplary guaranteed budgets, may include:

an adaptive partition for routing packets (80% share);

an adaptive partition for topology protocols (15% share), but with maximum thread priorities higher than the threads in the adaptive partition for routing packets; and an adaptive partition (5% share) for logging of both routing metrics and topology-protocol metrics.

In this case, adaptive partition scheduling has been used to reorganize various system functions so that certain functions are given priority during high CPU loads, while still ensuring that all system functions are given CPU execution time. Threads associated with routing and threads associated with logging routing metrics have been associated with separate adaptive partitions despite the fact that they are functionally related to routing operations. Similarly, two functionally unrelated components, routing metric logging and topology metric logging, have been associated with the same adaptive partition. This manner of assigning the various threads to different partitions enables the process scheduler 130 to reduce CPU time usage by the logging threads under high CPU load conditions and give priority to routing threads and topology protocol threads while still conducting metrics logging.

At block 225, a determination may be made as to which threads of the system will be allowed to run in a critical state. Designating a thread as critical gives it the ability to run in a manner that approximates a real-time system, even when the guaranteed budget for the adaptive partition budget might otherwise be exceeded. When a critical thread associated with a particular adaptive partition is run despite the lack of guaranteed budget for the adaptive partition, the adaptive partition is said to have gone into short-term debt. Critical threads may be associated with the various partitions, for example, at boot time. Critical threads are discussed in further detail below.

Each adaptive partition that is associated with a critical thread is assigned a critical time budget at block 235. The critical time budget may be specified, for example, in time units, such as milliseconds. In the exemplary system, the critical time budget is the amount of CPU time available to all critical threads associated with a given adaptive partition above that partition's guaranteed time budget during an averaging window. By employing critical designations and critical time budgets, a critical thread generally has an opportunity to run on the CPU even if its associated adaptive partition has exhausted its guaranteed budget. This will occur as long as the partition still has critical time budget available. Critical threads may provide the ability for real-time behavior within these partitions.

Various policies that the process scheduler 130 must follow may be optionally assigned to the system 100 at block 240. For example, a bankruptcy policy may be applied to one or more of the adaptive partitions to determine how the system 100 and/or process scheduler 130 handles a bankrupt state of the adaptive partition. Bankruptcy of a critical adaptive partition occurs when the adaptive partition has exhausted both its guaranteed CPU time budget and critical time budget over the duration of the averaging window. As a further example, system 100 may execute an overload notification policy that allows a process to register with the process scheduler 130 so that it is notified when a system overload occurs. A system overload occurs, for example, when all of the ready threads cannot be executed on the CPU over the duration of the averaging window. A process may register to be informed of an overload condition when the system 100 enters and/or leaves the overload state. Applications may use this overload notification to gracefully degrade their service, for example, by skipping important functions, or by reducing the precision of computation. Adaptive partitions may go over budget when some other adaptive partition is sleeping, as will be set forth below. This is not by itself necessarily considered to be a system overload, and therefore does not require triggering of the overload-notification policy.

At block 245, the process scheduler 130 is configured with data corresponding to the foregoing states, values, and/or assignments provided at blocks 205 through 240. As noted above, these states, values and/or assignments may be provided for use in the system 100 in a number of different manners, such as, by the system designer, by the system user, through other software programs, etc.

Block 250 represents execution of the threads in accordance with the configuration data of block 245. The attributes of the various adaptive partitions may be dynamic. To this end, the parameters set forth in one or more of the foregoing blocks may be changed in response to system requirements, system state, changes in system functions, etc., as represented by the flowline returning to block 205.

The threads in system 100 also may vary dynamically over time. For example, a thread or group of threads associated with an adaptive partition may spawn, or generate, other threads during operation. The originating thread may be referred to as a parent thread while a spawned thread may be referred to as a child thread. Process scheduler 130 may be configured so that child threads inherit the adaptive partition of their parent thread automatically. Alternatively, or in addition, an API may be provided that will allow spawning threads into other adaptive partitions. Such an API may be made available only to code with sufficient privilege. For example, a system application launcher may have such privileges.

Figure 3:
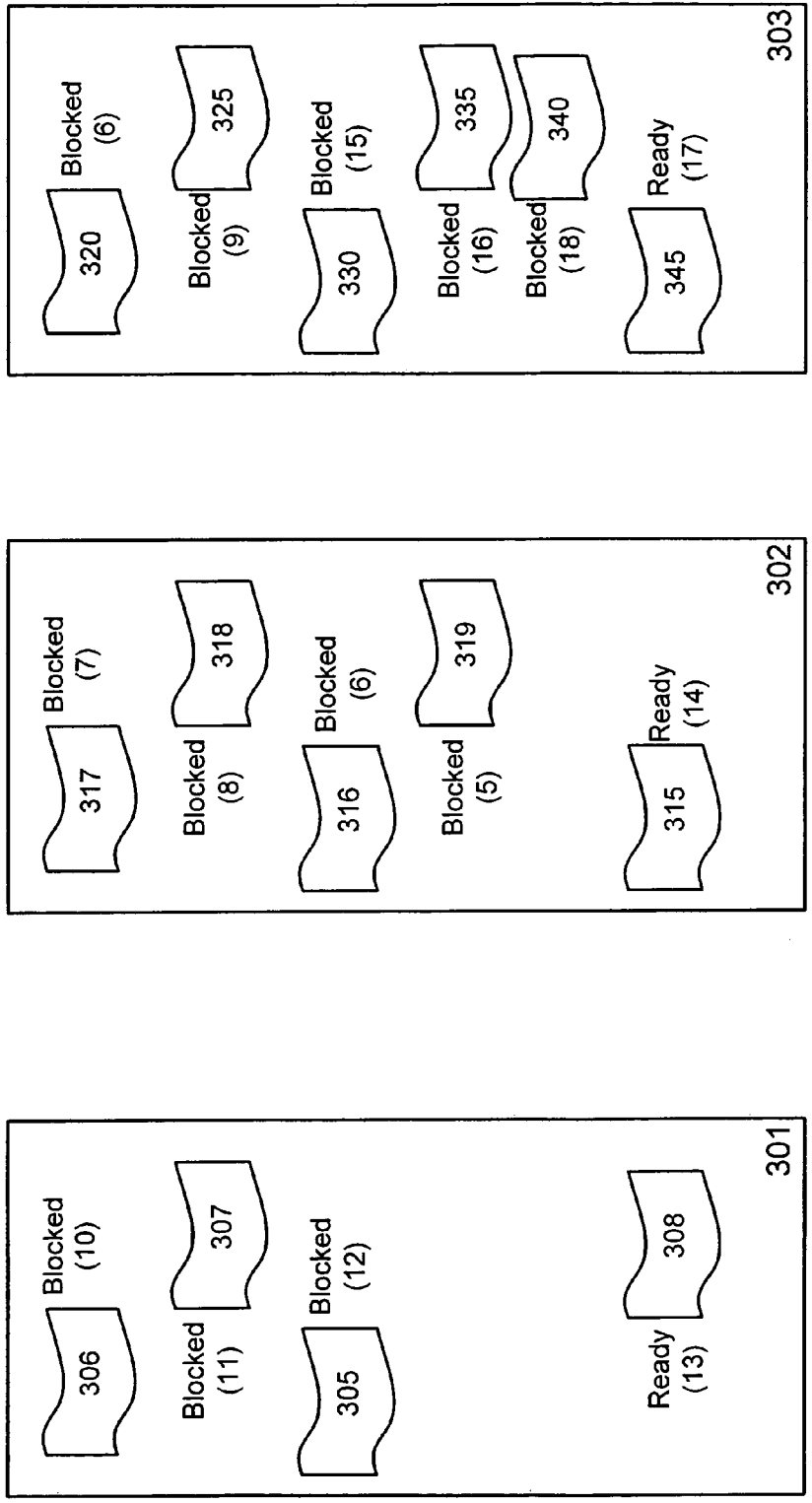
FIG. 3 is a diagram of one exemplary process scheduler that employs a plurality of adaptive partitions with their associated threads and thread priorities.

FIG. 3 illustrates one manner in which the process scheduler 130 may operate under normal load conditions in which none of the partitions exceeds its CPU budget. In this example, the process scheduler 130 has generated three adaptive partitions 301, 302, and 303. Adaptive partition 301 may be associated with the threads 305, 306, 307, and 308, of a multimedia application. Adaptive partition 302 may be associated with the threads 315, 316, 317, 318, and 319 of a Java application. Adaptive partition 303 may be associated with the threads 320, 325, 330, 335, and 340 of a system logging application. The threads 305-345 have various scheduling priorities, denoted in parentheses in FIG. 3, that may be independent of the guaranteed budget of the associated adaptive partition.

In operation, each adaptive partition 301-303 and thread 305-345 may assume different operative states. Adaptive partitions 301-303, for example, may operate in an active state or a sleep state. In the active state, the scheduling attributes of the adaptive partition may be used to schedule CPU time for the associated threads. A sleep state occurs when there are no ready threads associated with the adaptive partition. In such instances, the process scheduler 130 effectively treats the adaptive partition as non-existent.

Threads may assume, for example, a running state, a ready state or a blocked state. A thread is in the running state while it is being executed by the CPU. It is in a ready state when a set of conditions have been met that render the thread fully prepared for execution by the CPU at a time determined by the process scheduler 130. A thread is in the blocked state while the thread waits for the occurrence of one or more events. While in the blocked state, the thread is not ready to consume any CPU resources. Once the events awaited by the thread occur, the thread may become unblocked and enter the ready or running state.

The adaptive partitions 301-303 and corresponding threads 305-345 can be used to describe the operation of the process scheduler 130 during various load conditions. In this example, the process scheduler 130 makes the CPU available to execute ready threads 308, 315, and 345 assigned to each adaptive partition 301, 302, and 303, based on the priority of the ready threads. Under normal load conditions, the highest-priority thread in the system 100 will run immediately when it becomes ready. Whether a thread is ready may be indicated to the process scheduler 130 in a number of different manners including, for example, through the occurrence of an interrupt event or the like. In the illustrated example, the highest priority ready thread is thread 345, which has a priority of 17. Thread 345 will continue to operate in a running state until it is finished, blocked, or until the budget for adaptive partition 303 is exhausted. Under heavy load, if an adaptive partition exceeds its CPU budget, then its highest-priority thread does not run until the partition once again has time available in its CPU budget. This is a safeguard on the system 100 that divides insufficient CPU time among the partitions 301, 302, and 303. In this state, the processor runs the highest-priority thread in an adaptive partition with CPU time remaining in its guaranteed CPU time budget.

When an adaptive partition enters a sleep state, the process scheduler 130 allocates the CPU budget of the sleeping partition to other active adaptive partitions—even if the other active adaptive partitions have exceeded their budget. For example, if adaptive partition 303 enters a sleep state, the process scheduler 130 allocates the budget for adaptive partition 303 to adaptive partition 302, since adaptive partition 302 has the highest priority ready thread 315. If two or more adaptive partitions have threads with the same highest priority, the process scheduler 130 divides the free time in proportion to the other adaptive partitions' percentages. This allocation assists in preventing long ready-queue delay times in the case where two adaptive partitions have the same priority.

Figure 4:
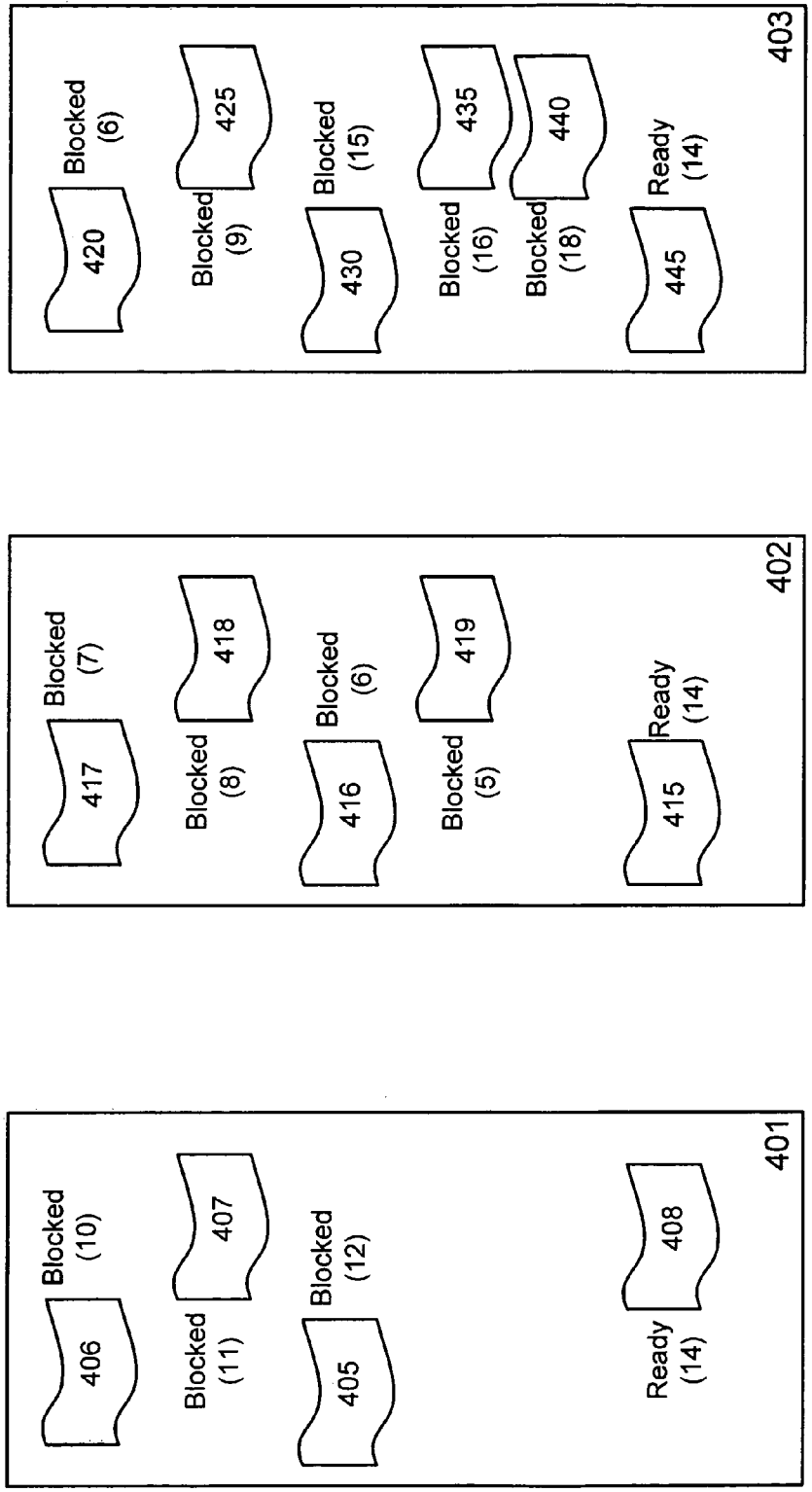
FIG. 4 is a diagram of a further exemplary process scheduler that employs a plurality of adaptive partitions with their associated threads and thread priorities, where the process scheduler is operating under different conditions than those shown in FIG. 3.

In the example of FIG. 4, there are three adaptive partitions 401, 402, and 403, with 70%, 20% and 10% CPU budget guarantees, respectively. Further, each adaptive partition 401, 402, and 403, includes a ready thread 408, 415, and 445, having a priority of 14. If adaptive partition 401 enters a sleep state through a blocking of thread 408, the process scheduler 130 allocates all of the available CPU time to adaptive partitions 402 and 403 in a 2:1 ratio, the ratio corresponding to their original CPU budget allocations. If adaptive partition 401 is in a sleep state for a short time, then the process scheduler 130 may ensure that partition 401 later receives CPU time at its guaranteed CPU time budget by reallocating the CPU resources so that adaptive partitions 402 and 403 pay back the CPU time that each utilized at the expense of partition 401. If adaptive partition 401 is in a sleep state for a long time, then some or all of the time used by adaptive partitions 402 and 403 may become free. Whether an adaptive partition is in a sleep state for a short time or a long time can be determined in various manners. For example, an adaptive partition can be said to be in a sleep state for a short time when it is in the sleep state for a duration of time that is less than (windowsize)−(budget percentage*windowsize) milliseconds within one averaging window.

If all adaptive partitions are at their CPU budget limits, then the process scheduler 130 may specify running of the highest-priority thread in the system 100. If two adaptive partitions have threads with the same highest priority, then the adaptive partition that has used the smallest fraction of its budget may be run. This manner of operation may be used to prevent long ready-queue delays that would otherwise occur. In the example shown in FIG. 4, the window size may be 100 ms, adaptive partition 401 is allotted 70% of the CPU budget and has used 40 ms, adaptive partition 402 is allotted 20% of the CPU budget and has used 5 ms, and adaptive partition 403 is allotted 10% of the CPU budget and has used 7 ms. All partitions have a ready thread at priority 14. In this situation, thread 415 of adaptive partition 402 is run because its relative fraction free is 5 ms/20 ms, or 0.25, while the relative fraction free for adaptive partition 401 is 40 ms/70 ms or 0.57 and 7 ms/10 ms or 0.70 for adaptive partition 403.

If an adaptive partition has exhausted the assigned CPU budget and one or more of its ready threads are designated as critical, then the process scheduler 130 may allow the adaptive partition to use its critical CPU budget to run the critical threads. The critical time budget is the amount of CPU time that the process scheduler 130 allocates to an adaptive partition to run all critical threads associated with the adaptive partition. This critical time budget constitutes CPU time that the process scheduler 130 allocates to the adaptive partition the partition's normal budget during an averaging window. Consequently, a critical thread may run even if the adaptive partition with which it is associated is out of budget, as long as the adaptive partition has not exhausted its critical time budget.

Figure 5:
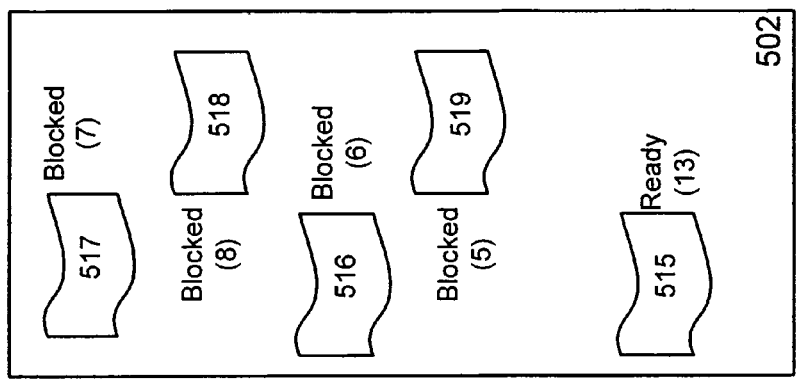
FIG. 5 is a diagram of an exemplary process scheduler that employs a plurality of adaptive partitions with their associated threads and thread priorities, where at least one of the ready threads has been designated as a critical thread.
Figure 5:
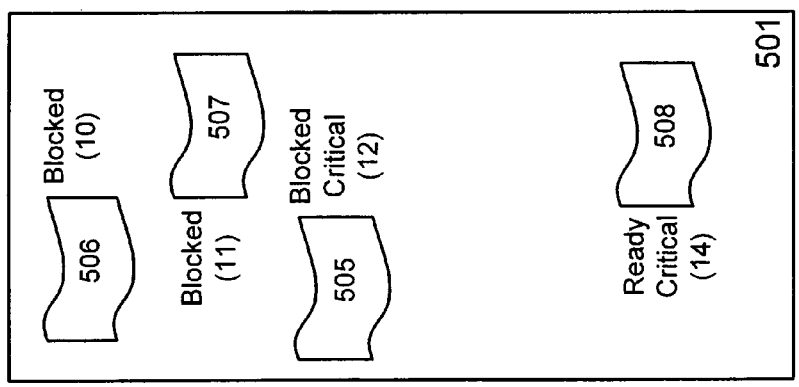

FIG. 5 illustrates a system having two adaptive partitions 501 and 502. Threads 505, 506, 507, and 508 are associated with adaptive partition 501, while threads 515, 516, 517, 518, and 519 are associated with adaptive partition 502. Adaptive partition 501 may comprise threads that are associated with, for example, an airbag notification process in a vehicle. Threads 505 and 508 of adaptive partition 501 have been designated as critical threads. However, only thread 508 is in a ready state.

In this example, adaptive partition 501 has exhausted its guaranteed CPU time budget. Nonetheless, critical thread 508 may be allowed to run because of the importance that has been placed on it through the critical designation. Consequently, the process scheduler 130 may allocate CPU time to critical thread 508 provided there is still CPU time in the critical time budget of adaptive partition 501.

When the process scheduler 130 schedules the running of a critical thread, such as thread 508, the process scheduler bills the thread's run time against the available guaranteed CPU time budget of the thread's associated adaptive partition. However, the process scheduler 130 counts the CPU time used by the critical thread against the critical time budget of the adaptive partition only if the process scheduler 130 would not have otherwise run the critical thread. To this end, CPU time used in running a critical thread is not counted against the critical time budget of the associated adaptive partition when 1) the system is not overloaded, or 2) the system is overloaded, but one or more adaptive partitions may not be exhausting their guaranteed CPU time budgets.

A critical thread may remain in a critical running state until it enters a blocking state. That is, it may leave the running or ready state as is the case with any other thread. As noted above, this may occur while the thread is waiting for a message, interrupt notification, etc. The criticality of a thread, or billing to its adaptive partition's critical time budget, may be inherited along with the adaptive partition during operations which trigger priority inheritance.

The short-term debt is bounded by the critical time budget specified for the partition. Over time, the partition may be required to repay short-term debt. A critical thread that exceeds the critical time budget of the adaptive partition may be considered to drive the associated adaptive partition into bankruptcy. Bankruptcy may be handled as an application error, and the designer may specify the system's response. Exemplary choices for a response include: 1) forcing the system to reboot; 2) notifying an internal or external system watchdog; and/or 3) terminating and/or notifying other designated processes. The system may add an entry to a log or the like if an adaptive partition exhausts its critical time budget. When the budgets for the adaptive partitions are dynamically altered (through, for example, a mode change, an API call to modify CPU percentages, or the like), the process scheduler 130 may impose a delay before testing an adaptive partition for bankruptcy. This allows the budgets to stabilize before an adaptive partition may be declared bankrupt.

The designation of a thread as critical may occur in a number of different manners. For example, the system may automatically mark threads that are initiated by an I/O interrupt as critical. The system also may specify a set of additional applications or operating system notification events, for example, timers, which may mark their associated handler threads as critical. An API also may be used to mark selected threads as critical. Still further, child threads of critical parent threads may be automatically designated as critical.

Figure 6:
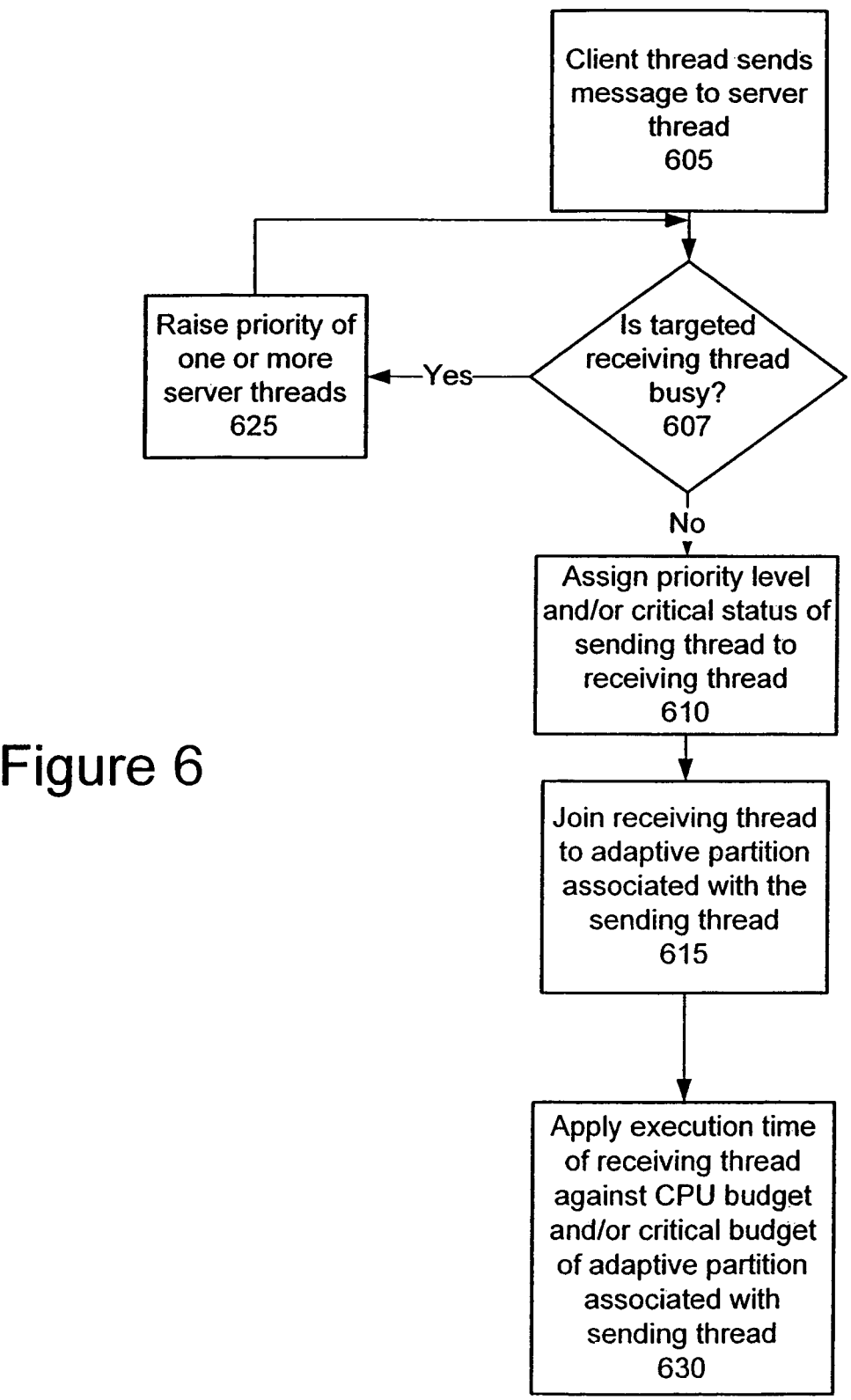
FIG. 6 is a flow diagram showing a plurality of interrelated processes that may be used to implement the process scheduler in a software environment in which there are sending threads and receiving threads.

The process scheduler 130 also may be adapted for use in client/server systems in which messages are passed from one or more sending/client threads for receipt and/or processing by one or more receiving/server threads. FIG. 6 shows a number of interrelated processes that may be used to implement process scheduler 130 in such a client/server environment. At block 605, a client thread in a first adaptive partition sends a message to a server thread in a second adaptive partition. At block 607, a check is made to determine whether the targeted receiving thread is busy. When a client thread sends a message to a server thread, the server thread that receives the message may inherit the priority of the sending thread. This prevents priority inversion, since the server thread is doing work on behalf of the sending client. Inheriting of the priority level of the sending thread by the server thread is shown at block 610 and occurs, for example, when the targeted receiving thread is not busy. The process scheduler also may assign the same critical status of the client thread to the server thread at block 610. At block 615, the process scheduler 130 may associate the server thread with the same adaptive partition that is associated with the client thread.

Figure 7:
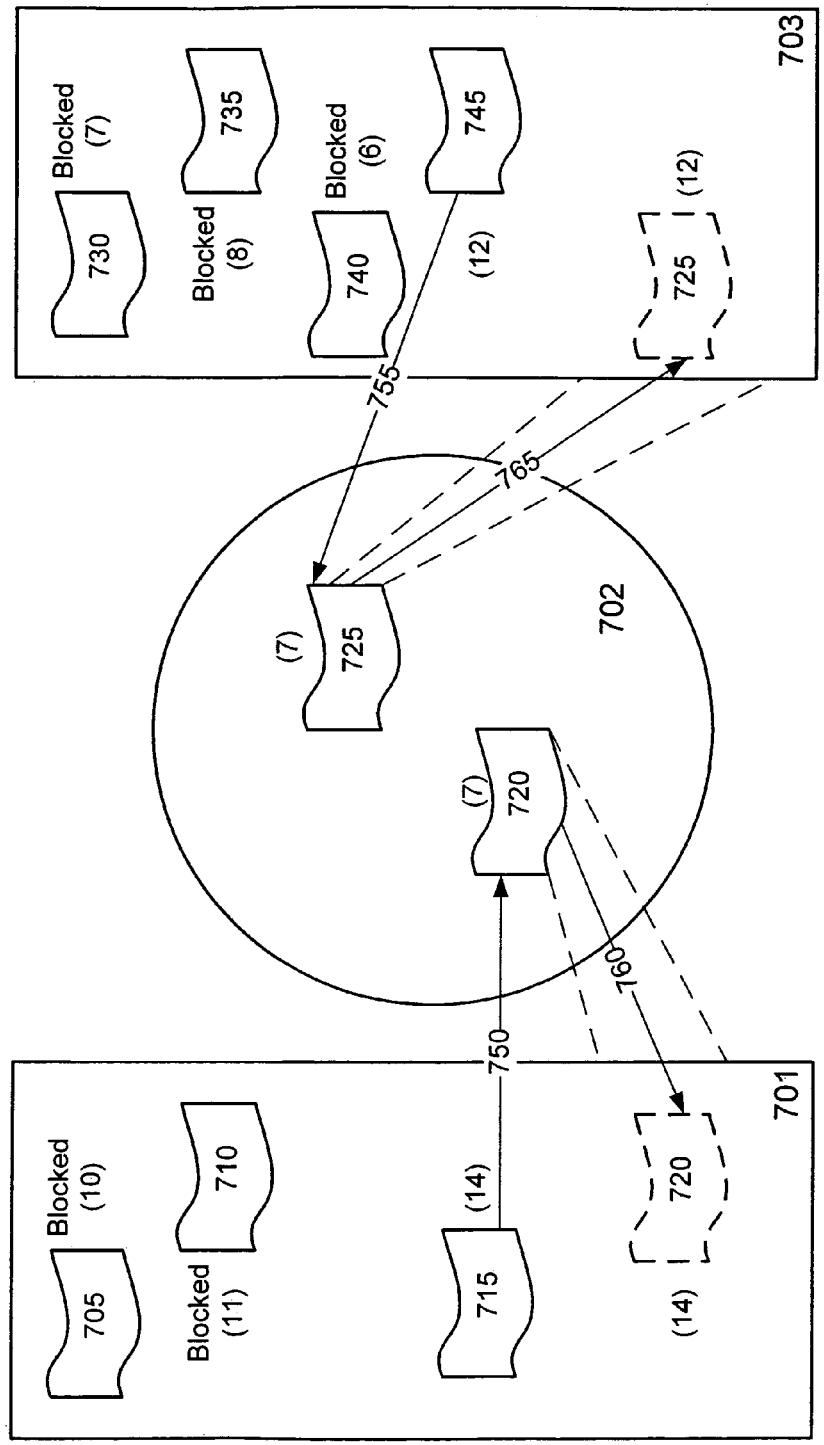
FIG. 7 is a diagram illustrating the operation of the process scheduler described in connection with FIG. 6.

FIG. 7 illustrates a system that may be used to explain some aspects of the operations shown in FIG. 6. In this example, there are three adaptive partitions 701, 702, and 703. Adaptive partition 702 may include server threads 720 and 725 of the type run, for example, by the processes of a file system. The attributes assigned to adaptive partition 702 may vary with the design of the system. However, in this example, adaptive partition 702 has been generated with a CPU time budget of zero, and threads 720 and 725 have been assigned a default priority of 7. Adaptive partition 701 may comprise a number of different threads 705, 710, and 715, where thread 715 constitutes a client thread that sends messages to one or more server threads of adaptive partition 702. Similarly, adaptive partition 703 may comprise a number of different threads 730, 735, 740, and 745, where thread 745 constitutes a client thread that sends messages to one or more server threads of adaptive partition 702.

As shown by line 750 of FIG. 7, client thread 715 has passed a message that is received or otherwise processed by thread 720 of adaptive partition 702. Similarly, client thread 745 of adaptive partition 703 has passed a message that is received or otherwise processed by thread 725 of adaptive partition 702, as indicated by line 755. When the message transfers 750 and 755 occur, the process scheduler 130 associates each server/receiving with the adaptive partition of the thread that sent the message. In this case, server thread 720 is temporarily associated with adaptive partition 701, as indicated by line 760, and is assigned the same priority, 14, as thread 715. Likewise, server thread 725 is temporarily associated with adaptive partition 703, as indicated by line 765, and is assigned to the same priority, 12, as thread 745. Both threads 720 and 725 may be placed in a ready state, while threads 715 and 745 may be placed in a blocked state as the respective messages are processed. Once thread 720 has completed processing the message received from thread 715, thread 720 may return to its original state where it is associated with adaptive partition 702 with a default priority of 7. Also, thread 725 may return to its original state where it is associated with adaptive partition 702 with a default priority of 7 once it has completed processing of the message received from thread 745.

Sometimes, a client thread may attempt to communicate with a server thread that is busy processing one or more messages that have been previously received from other client threads. For example, if thread 740 of adaptive partition 703 becomes unblocked and attempts to send a message to server thread 725 while server thread 725 is busy processing one or more prior messages received from thread 745, server thread 725 typically will be unable to respond to thread 740 until it has completed processing the prior messages from client thread 745. In such instances, the process scheduler 130 temporarily may raise the priorities of one or more server threads that, for example, wait on the same connection path as the client thread. The query and action corresponding to these operations are illustrated at blocks 607 and 625 of FIG. 6. As applied to the system of FIG. 7, the connection path between threads assigned to adaptive partition 703 and threads assigned to adaptive partition 702, for example, may be assigned the same identification name/number. As a result, the priority of server thread 725 may be raised in an attempt to reduce the latency that may otherwise occur before server thread 725 is available to process the message from client thread 740. Depending on the nature of the threads in adaptive partition 702, the priority levels of multiple server threads may be raised.

At block 630 of FIG. 6, the process scheduler 130 operates to bill the execution time for each thread 720 and 725 in the appropriate manner. The appropriate manner of billing the execution time may vary. One manner includes applying the execution time of the receiving thread against the CPU budget and/or critical CPU budget of the adaptive partition associated with the sending thread. In the example of FIG. 7, the execution time used by thread 720 in responding to a message sent by thread 715 is counted against the CPU budget and/or critical CPU budget of adaptive partition 701. Similarly, the execution time used by thread 725 in responding to a message sent by thread 745 is counted against the CPU budget and/or critical CPU budget of adaptive partition 703.

System components, such as filesystems, device drivers, and the like may be assigned a guaranteed budget of zero. In such instances, the CPU time used by the threads associated with the system component is billed to their clients. However, sometimes the process scheduler 130 finds out too late which threads a particular system component thread has been ultimately working for. As a result, the process scheduler 130 may not be able to bill the running of the threads of the system components in a timely manner and/or to the proper adaptive partition. Additionally, some system components, such as device drivers, may have background threads (e.g. for audits or maintenance) that require budgets that cannot be attributed to a particular client. In those cases, the system designer may measure the background operations and unattributable loads associated with the various system components. The resulting measurements may be used to provide non-zero budgets to the adaptive partitions associated with the threads of the various system components.

In operation, the process scheduler 130 may do more than simply direct the running of the highest priority ready thread associated with an adaptive partition having guaranteed CPU time left in its budget. For example, when all adaptive partitions have exhausted their guaranteed CPU time budgets at approximately the same time, then the process scheduler 130 may direct the running of the highest priority thread in the system irrespective of the attributes of the associated adaptive partition. Also, when adaptive partitions have threads of the equal highest priorities, the process scheduler 130 may assign CPU time using the ratio of their guaranteed CPU time percentages. Finally, critical threads may be run even if their adaptive partition is out of budget, provided the adaptive partition still possesses an amount of its critical time budget.

Process scheduler 130 may employ one or more ordering functions, f(ap), associated with each adaptive partition, ap, in its scheduling determinations. Ordering functions may be calculated in a variety of different manners. The results obtained by calculating the ordering functions may be compared with one another to determine how the process scheduler 130 will scheduled the threads associated with the various adaptive partitions of the system.

In calculating the ordering functions, f(ap), a number of different variables may be used. A few of the variables are described here in connection with one example. In the following example, let "is_critcal(ap)" be a boolean variable. The value of "is_critcal(ap)" depends on 1) whether the adaptive partition, ap, has available critical budget, and 2) whether the highest priority ready thread in the adaptive partition, ap, has been assigned a critical state. Let "has_budget(ap)" be a boolean variable that indicates whether an adaptive partition, ap, has consumed less CPU time than its guaranteed CPU time budget during the last averaging window. Let "highest_prio(ap)" be an integer variable that indicates the highest priority of all ready-to-run threads in an adaptive partition, ap. Let "relative_fraction_used(ap)" be a real number variable that corresponds to the ratio of the number of microseconds of CPU time consumed by the adaptive partition, ap, during the last averaging window, divided by the budget of the adaptive partition, ap, when expressed, for example, in microseconds. Finally, let b(ap) be a boolean variable corresponding to the current rate of CPU time consumption of threads in the adaptive partition, ap. More particularly, b(ap) may be assigned a logical true value if, given the current rate of CPU time consumption by the threads associated with the partition, ap, the value of has_budget(ap) also would be a logical true value at the time the process scheduler 130 would likely be called upon to again schedule a thread associated with the adaptive partition. Otherwise, b(ap) may be assigned a logical false value. It will be recognized that other variables, or less than all of the foregoing variables, may be used to calculate and ordering function f(ap). Which variables are used may be dependent on the system designer and/or end-user.

The value of b(ap) may be calculated in a number of different manners. For example, let the variable t indicate the current time in a high-resolution counter, and a tick be the length of time between regular events during which the process scheduler examines all partitions. The period of the tick should be less than the size of the averaging window ("windowsize"). Let the function cputime_used(t1,t2) correspond to a real value of the CPU time used by the threads of partition, ap, between absolute times t1 and t2. Further, let budget(ap) correspond to the time value of the guaranteed budget for the partition, ap. The value for b(ap) then may be calculated using the following equation:

$$b(ap) = \text{Boolean } (cpu\_time\_used(now, now-window\-size) - cpu\_time\_used(now-windowsize+tick, now-windowsize) < budget(ap)).$$

Figure 8:
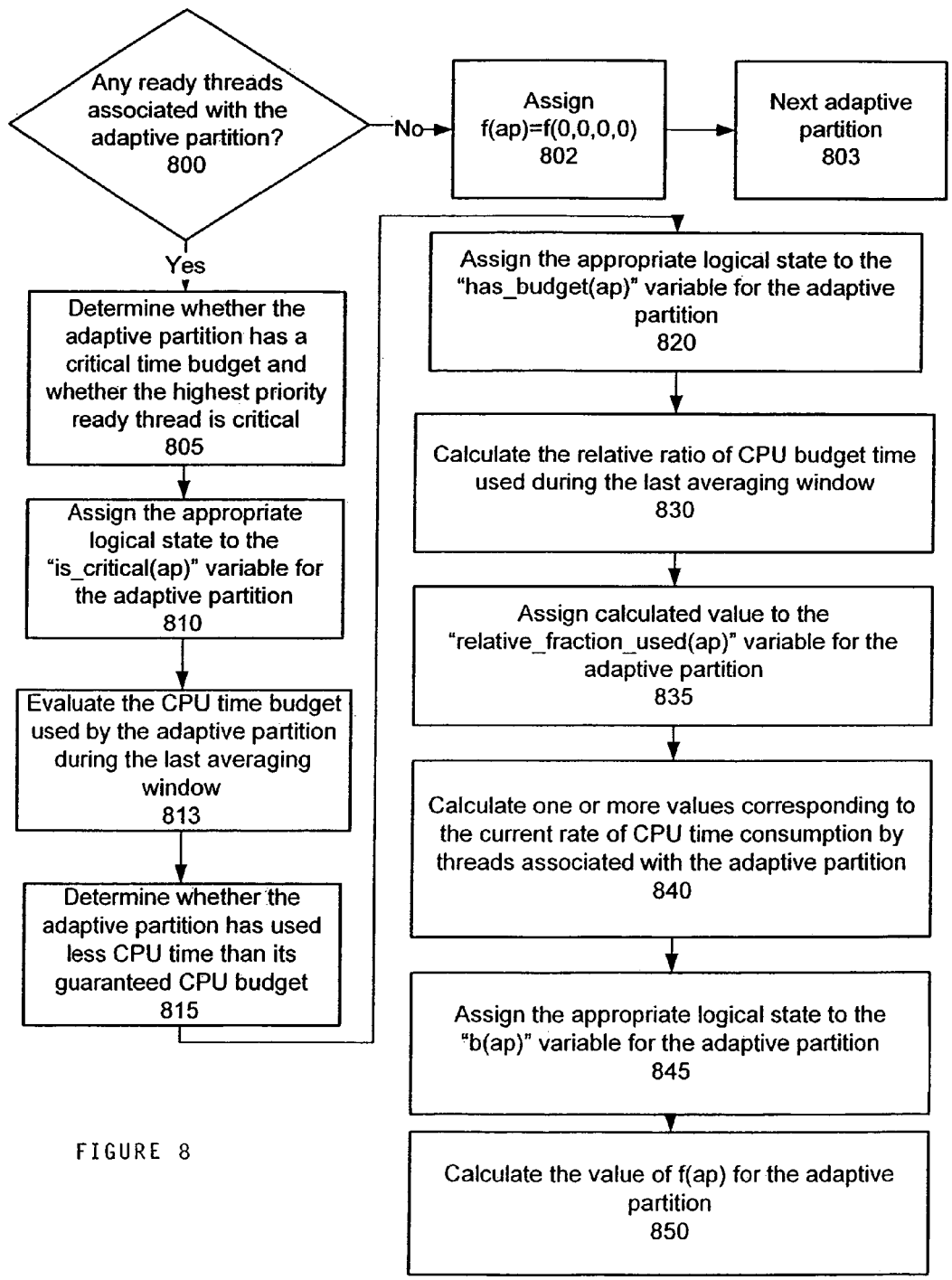
FIG. 8 is a flow diagram showing a plurality of interrelated processes that may be used to schedule the running of threads associated with the various adaptive partitions.

One manner of calculating an ordering function, f(ap) using the foregoing variables is shown in FIG. 8. The illustrated operations may be executed for each adaptive partition, ap, used in the system 100. As shown, the process scheduler 130 determines whether the partition has any threads that are ready to run at block 800. If there are no ready threads associated with the adaptive partition, ap, the ordering function, f(ap), for the adaptive partition may be assigned the values f(0,0,0,0), at block 802 and calculation of the ordering function for the next adaptive partition may be initiated at block 803. The process scheduler 130 determines if the adaptive partition, ap, has critical CPU budget available at block 805 and, if so, whether the highest priority ready thread in the adaptive partition, ap, has been assigned a critical state. Based on this determination, the process scheduler 130 assigns the appropriate logical state to the "is_critical(ap)" variable at block 810. At block 813, the process scheduler 130 evaluates the CPU budget used by the adaptive partition during the last averaging window. At block 815, the process scheduler 130 determines if the adaptive partition has used less CPU time than its guaranteed CPU time budget. Based on this determination, the process scheduler 130 assigns the appropriate logical state to the "has_budget(ap)" variable at block 820. The relative ratio of CPU budget time used during the last averaging window is calculated at block 830 by taking the value obtained at block 813 and dividing it by the guaranteed CPU budget time for that adaptive partition. This value is assigned to the "relative_fraction_used(ap)" variable at block 835.

At block 840, the process scheduler 130 calculates one or more values corresponding to the current rate of CPU time consumption by threads associated with the adaptive partition. These values are used to assign the appropriate logical state to the b(ap) variable at block 845.

Using all or a subset of the foregoing variables, the ordering function, f(ap), for the given adaptive partition, ap, is calculated at block 850. In this example, the ordering function, f(ap), is calculated using the ordered values (x,a,y,z), where x=is_critical(ap) OR has_budget(ap); a=(Not x) AND b(ap); y=highest_prio(ap); and z=1-relative_fraction_used (ap). In calculating the ordering function, f(ap), the value of x is given more significance than the values of a, y, or z, the value of a is given more significance than the values of y or z, and the value of y is given more significance than the value of z.

Figure 9:
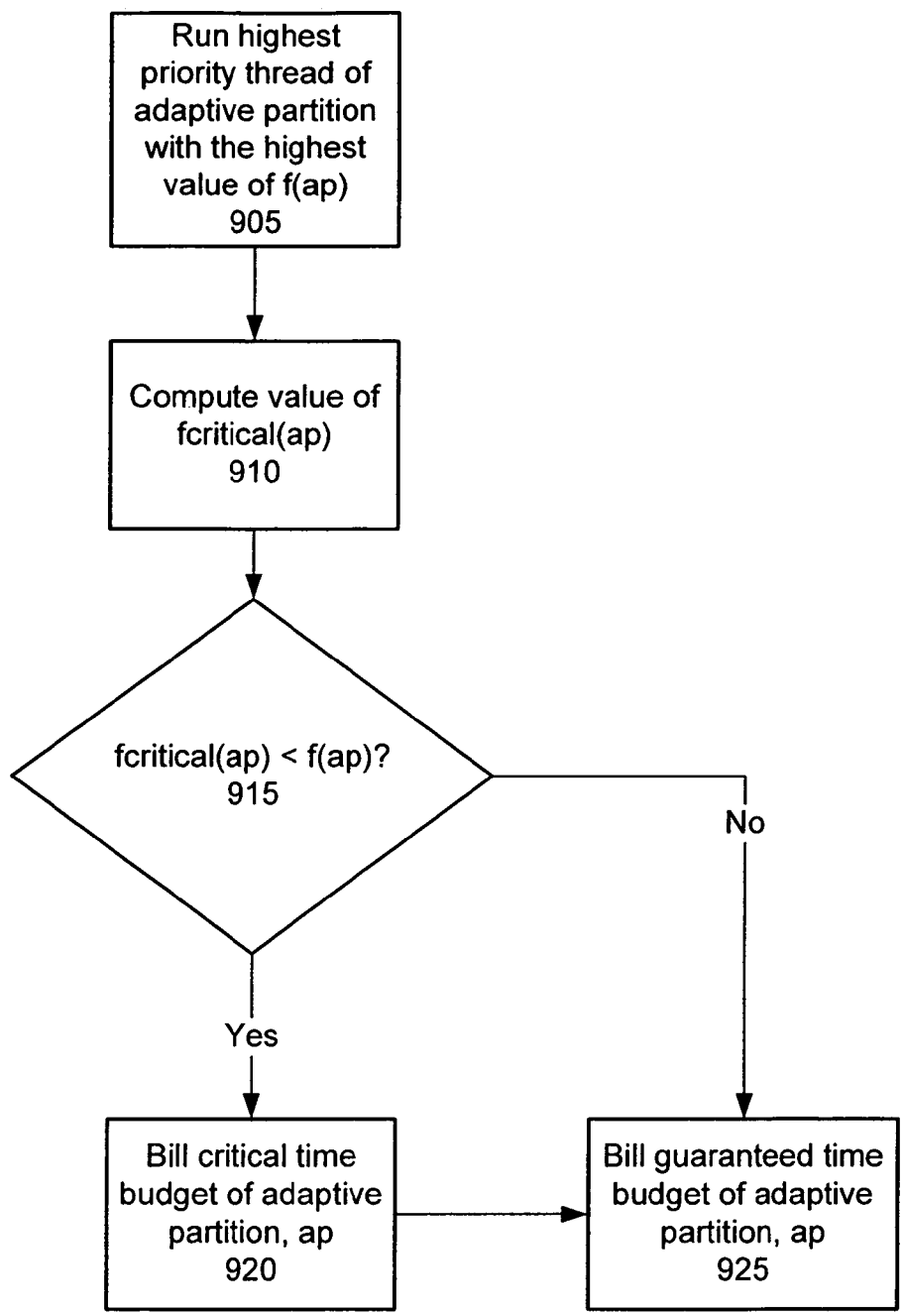
FIG. 9 is a flow diagram showing a plurality of interrelated processes that may be used to determine whether the process scheduler bills the guaranteed budget or critical budget associated with the running thread.

The process scheduler 130 runs the highest priority thread of the adaptive partition having the largest f(ap) as shown at block 905 of FIG. 9. However, the process scheduler 130 must determine whether the running time for the thread is to be billed to the critical budget of the adaptive partition or solely to the guaranteed budget. To this end, the process scheduler 130 may compute another function, fcritical(ap), using one or more of the foregoing variables. In this example, fcritical(ap) is calculated using the ordered values (w,d,y,z), where w=has_budget(ap); d=(NOT w) AND b(ap); y=highest_prio (ap); and z=1-relative_fraction_used(ap). In the calculation of fcritical(ap), the value of w is given more significance than the values of d, y, or z, the value of d is given more significance than the values of y or z, and the value of y is given more significance than the value of z. This calculation is shown at block 910. A comparison between the fcritical(ap) and f(ap) values for the adaptive partitions is executed at block 915. If the value of fcritical(ap) is less than the value of f(ap), then the running time for the thread is billed to the critical budget of the adaptive partition at block 920 as well as to the guaranteed budget at block 925. If the value of fcritical(ap) is greater than or equal to the value of f(ap), then the running time for the thread is solely billed to the guaranteed budget of the adaptive partition at block 925. Any calculations used by the process scheduler 130 should ensure that the critical budget for the adaptive partition is only used if the highest priority critical thread associated with that adaptive partition would not have been selected to run by process scheduler 130 had the thread or the partition not been critical.

Figure 10:
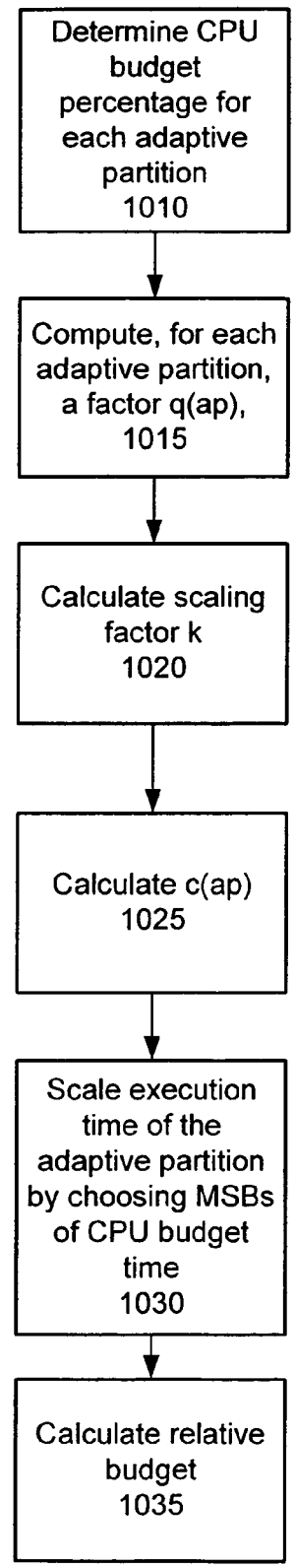
FIG. 10 is a flow diagram showing a plurality of interrelated processes that may be used to calculate the relative budget used by an adaptive partition, where the value of the relative budget used may be employed in the process shown in FIG. 8.

FIG. 10 shows a number of different interrelated processes that may be used to execute a method for calculating the relative ratio of CPU budget time consumed during the last averaging window, as described in block 830 of FIG. 8. The relative fraction CPU budget time consumed by an adaptive partition is, for example, the number of microseconds that threads associated with the adaptive partition ran during the last averaging window divided by its share of the averaging window in microseconds. Alternatively, this may be expressed as (total_CPU_time_consumed)/(windowsize*percentage). To reduce the potential need for floating-point division, the process scheduler 130 may compute a number that has substantially the same ordering properties as (total_CPU_time_consumed)/(windowsize*percentage) for each adaptive partition. Thus, a constant c(a) may be pre-computed so that the adaptive partition with the highest (total_CPU_time_consumed)*c(ap) also is the adaptive partition with the highest (total_CPU_time_consumed)/(windowsize*percentage).

The function c(ap) may be precalculated during, for example, system startup, and whenever the guaranteed CPU budgets are reallocated between the various adaptive partitions of the system. At block 1010, the CPU budget percentage for each adaptive partition are determined, for example, at start-up. At block 1015, the system may compute, for each adaptive partition, a factor, q(ap). The value of q(ap) may be calculated, for example, as the product of the percentage CPU budgets of all the other adaptive partitions. At block 1020, a scaling factor is calculated. In this example, if the maximum averaging error is max_error (e.g. 0.005 for ½ a percent), then k=min(list of q(ap))*max_error. A constant scaling factor c(ap) is calculated at step 1025. In this example, c(ap) is calculated as c(ap)=q(ap)/k. The value, (total_CPU_time_ consumed)*c(ap) has the same ordering properties as (total_CPU-time_consumed)/(windowsize*percentage) within an error tolerance of max_error.

To practically compare the relative fraction used by different adaptive partitions, the process scheduler 130 may need to multiply the run time of the threads associated with the adaptive partitions by c(ap). However the billed times may be large numbers. If the process scheduler 130 is to be implemented using single-multiply instructions in these calculations, the billed times may be first scaled choosing a number of most significant bits of the CPU budget time at block 1030. The degree of scaling may be set by the value of max_error. However, any reasonable choice for max_error (e.g. ¼ to ½%) can be satisfied by choosing only the most significant 16 bits of the billed run-time. In such instances, the system may be calculating (total_CPU_time_consumed)>>32*c(ap). At block 1035, the relative budget ratio is calculated as c(ap)*(adaptive partition execution time), where (adaptive partition execution time) constitutes a selected number of the most significant bits of (total_CPU_time_consumed).

An error tolerance of 0.5% to 0.25% is considered sufficient for an implementation. However, the application may include the notion that for any specified error tolerance, a minimal number of bits is chosen to both represent c(ap), the scaled value of the CPU time executed by adaptive partition ap, during the last averaging windowsize time, and the product of c(ap) and the scaled CPU time. The minimal number of bits is chosen for both representations and executing multiplication functions so that all representations and arithmetic errors are less than or equal to a chosen error tolerance.

Billing of CPU time to each of the adaptive partition in a system may take place in a number of different manners and may occur many times during the operation of the process scheduler 130. For example, billing of an adaptive partition may occur whenever 1) a thread starts running from a blocked state, 2) a thread stops running (i.e., when it has been preempted by a higher priority thread, when it has been blocked, or the like), and/or 3) at other times when an accurate accounting of the CPU time is needed by the process scheduler 130.

Typically, process schedulers use standard timer interrupts, or ticks, to determine how long a thread has used the CPU. Tick periods are often on the order of one to several milliseconds.

The process scheduler 130, however, may include code that effectively microbills the execution time of the various threads of the system. To this end, a high-resolution hardware and/or software counter having a period substantially less than the tick periods may be employed. Each time a thread starts or stops running, the process scheduler 130 assigns a timestamp to the associated partition corresponding to the value of the high-resolution counter. The timestamp values may be scaled to a useful common time unit. The differences between the timestamps for adjacent start and stop times of a thread are used to microbill the appropriate adaptive partition.

The high-resolution counter may be implemented in a number of different manners. For example, some CPUs have a built-in counter that increments at about the clock frequency at which the CPU is run. In such situations, the built-in counter may be used in the microbilling process. In another example, a high-resolution counter may be simulated using software by querying an intermediate state of a programmable count-down timer that, for example, may normally be used to trigger clock interrupts. This may be the same counter used to provide an indication that a tick interval has occurred. In such situations, the timestamps should take into consideration both the counter value and the number of ticks that have occurred from a given reference point in time so that the timestamps accurately reflect the start times and stop times of the individual threads.

The foregoing process scheduler 130 also may be used in systems that employ mutexes. Mutexes are used to prevent data inconsistencies due to race conditions. A race condition often occurs when two or more threads need to perform operations on the same memory area, but the results of computations depend on the order in which these operations are performed. Mutexes may be used for serializing shared resources. Anytime a global resource is accessed by more than one thread the resource may have a mutex associated with it. One may apply a mutex to protect a segment of memory ("critical region") from other threads. The application gives a mutex to threads in the order that they are requested. However, the process scheduler 130 may be adapted to deal with the problems that occur when a low-priority thread, which may hold the mutex, unreasonably delays access to higher-priority threads that are waiting for the same mutex.

Figure 11:
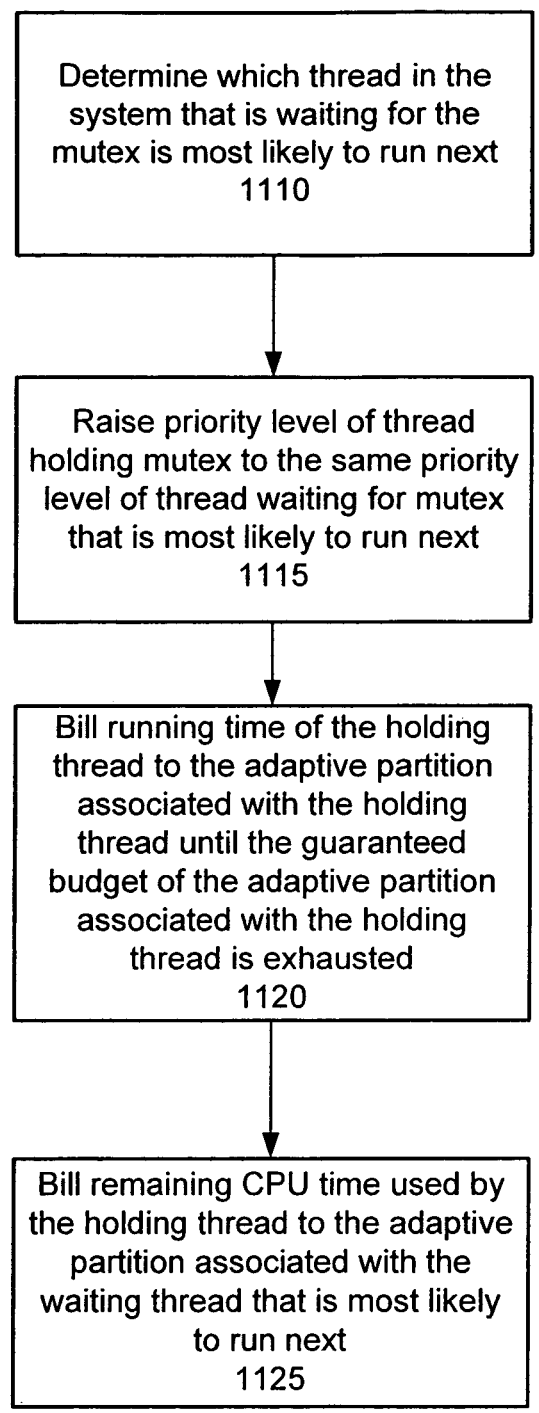
FIG. 11 is a flow diagram showing a plurality of interrelated processes that may be used to schedule the running of threads that access the same mutexes.

FIG. 11 shows a method for prioritizing access to a mutex in an adaptive partitioning system, when one thread may hold a mutex, and several other threads may be waiting for the same mutex. When the partition associated with the thread holding the mutex runs out of guaranteed CPU time budget, the process scheduler 130 may begin billing the run time of the thread holding the mutex to the partition of the thread waiting for the mutex which, of all the threads waiting for the mutex, is most likely to run next. The process scheduler 130 also may begin billing the run time of any thread deemed to be working on behalf of the thread holding the mutex to the adaptive partition associated with the thread holding the mutex. A determination is made at block 11110 to identify the thread that is most likely to run next (i.e., the thread that will run after the thread holding the mutex is blocked, finishes, or the like). The waiting thread, which may be waiting for the same mutex as the current thread holding the mutex, may be determined to be "most likely to run next". At block 1115, the process scheduler 130 may raise the priority level of the thread holding the mutex to the priority of the waiting thread which is most likely, of all the waiting threads, to run next. The process scheduler 130 may bill the adaptive partition associated with the current thread holding the mutex for its running time while holding the mutex until the adaptive partition's CPU budget is exhausted (reaches zero) at block 1120. At block 1125, the remaining CPU time used by the holding thread is billed to the adaptive partition that is associated with the waiting thread that is most likely to run next.

The thread "most likely to run next" may be computed by applying, pairwise, a "compare two threads" process repeatedly on pairs of threads in a list of waiting threads. The "compare two threads" process may be executed as follows, where A and B are the two threads to be compared: A function f(ap) is constructed, which includes the ordered values (x,a, y,z). This is the same ordering function f(ap) constructed above. Then, let partition_of(X) mean the partition containing the thread X. Then, if f(partition_of(A))>f(partition_of (B), thread A is more likely to run than thread B. The function f(X) is constructed for each thread to be compared until the thread with the highest f(X) is determined. The thread with the highest f(X) may be determined to be the "thread most likely to run next" and its associated adaptive partition may be billed accordingly for the running time of the thread holding the mutex once the adaptive partition associated with the thread holding the mutex has exhausted its guaranteed CPU budget.

The systems and methods described above may be configured to run in a transaction processing system where it is more important to continue to process some fraction of the offered load rather than to fail completely in the event of an overload of processing capacity of the system. Examples of such applications include Internet routers and telephone switches. The systems and methods also may be configured to run in other real-time operating system environments, such as automotive and aerospace environments, where critical processes may be designated that need to be executed during critical events. An example may be in an automotive environment, where an airbag deployment event is a low probability event, but must be allocated processor budget should the event be initiated.

The systems and methods also may be configured to operate in an environment where untrusted applications may be in use. In such situations, applications such as Java applets may be downloaded to execute in the operating system, but the nature of the application may allow the untrusted application to take over the system and create an infinite loop. The operating system designer will not want such a situation, and may create appropriate adaptive partitions so the untrusted application may be run in isolation, while limiting access to CPU time which other processes will have need of.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system comprising:
a processor;
one or more memory storage units;
software code stored in the one or more memory storage units, where the software code is executable by the processor to generate a plurality of adaptive partitions that are each associated with a plurality of process threads, where each of the plurality of adaptive partitions has a corresponding processor budget and the process threads comprise:
  a mutex holding thread associated with a first adaptive partition of the plurality of adaptive partitions, where the mutex holding thread is configured to gain exclusive access to a mutex object,
  a mutex waiting thread associated with a second adaptive partition of the plurality of adaptive partitions, where the mutex waiting thread waits for access to the mutex object when the mutex object is held by the mutex holding thread,
where the software code further comprises a scheduling system executable by the processor for selectively allocating the processor to run the process threads based, at least in part, on the processor budget of the associated adaptive partitions, and
where the scheduling system bills processor allocation used to run the mutex holding thread to the processor budget of the second adaptive partition when the processor budget of the first adaptive partition has been exhausted.

2. The system of claim 1, where the processor comprises a symmetric multiprocessor.

3. The system of claim 1, where the scheduling system bills processor allocation used to run one or more process threads working on behalf of the mutex holding thread to the processor budget of the first adaptive partition.

4. The system of claim 1, and further comprising one or more mutex waiting threads associated with one or more further adaptive partitions of the plurality of adaptive partitions, where the one or more mutex waiting thread wait for access to the mutex object when the mutex object is held by the mutex holding thread.

5. The system of claim 4, where the mutex waiting thread associated with the second adaptive partition is the process thread which, of all the mutex waiting threads, the scheduling system is most likely to run next upon availability of the mutex object.

6. The system of claim 1, where the scheduling system generates an ordering function value for each of the plurality of adaptive partitions associated with a mutex waiting thread, and where the scheduling system compares one or more of the ordering function values to one another to determine which, of all the mutex waiting threads, the scheduling system is most likely to run next upon availability of the mutex object.

7. The system of claim 1, where the mutex holding thread has a first run priority level and the mutex waiting thread has a second run priority level that is higher than the first run priority level, and where the scheduling system raises the priority level of the mutex holding thread to the second priority level.

8. A method of operating a process scheduler in a processing system having a processor and a plurality of adaptive partitions that are each associated with a plurality of process threads, each of the adaptive partitions having a processor budget, the method comprising:
- generating a mutex holding thread associated with a first adaptive partition of the plurality of adaptive partitions;
- holding a mutex object using the mutex holding thread;
- generating a mutex waiting thread associated with a second adaptive partition of the plurality of adaptive partitions;
- preventing the mutex waiting thread from accessing the mutex object while the mutex object is held by the mutex holding thread; and
- billing processor allocation used to run the mutex holding thread to the processor budget of the second adaptive partition when the processor budget of the first adaptive partition has been exhausted.

9. The method of claim 8, where the mutex holding thread has a first run priority level and the mutex waiting thread has a second run priority level that is higher than the first run priority level, and where the method further comprises raising the priority level of the mutex holding thread to the second priority level.

10. The method of claim 8, and further comprising billing processor allocation used to run one or more process threads working on behalf of the mutex holding thread to the processor budget of the first adaptive partition.

11. A method of operating a process scheduler in a processing system having a processor and a plurality of adaptive partitions that are each associated with a plurality of process threads, each of the adaptive partitions having scheduling attributes including a processor budget, the method comprising:
- generating a mutex holding thread associated with a first adaptive partition of the plurality of adaptive partitions;
- holding a mutex object using the mutex holding thread;
- generating a plurality of mutex waiting threads associated with two or more further adaptive partitions of the plurality of adaptive partitions;
- preventing the mutex waiting thread from accessing the mutex object while the mutex object is held by the mutex holding thread; and
- determining which of the waiting threads is most likely to be run next on the processor upon release of the mutex object by the mutex holding thread;
- billing processor allocation used to run the mutex holding thread to the processor budget of the adaptive partition associated with the waiting thread that is most likely to run next on the processor upon release of the mutex object by the mutex holding thread when the processor budget of the first adaptive partition has been exhausted.

12. The method of claim 11, where the mutex holding thread has a first run priority level and the waiting thread has a second run priority level that is higher than the first run priority level, and where the method further comprises raising the priority level of the mutex holding thread to the second priority level.

13. The method of claim 11, and further comprising billing processor allocation used to run one or more process threads working on behalf of the mutex holding thread to the processor budget of the first adaptive partition.

14. The method of claim 11, where the operation of determining which of the mutex waiting threads is most likely to be run next on the processor upon release of the mutex object by the mutex holding thread comprises:
- calculating an ordering function value for each of the adaptive partitions associated with a mutex waiting thread, where the ordering function value of a given adaptive partition is determined from one or more scheduling attributes of the given adaptive partition; and
- comparing the ordering function values for each of the adaptive partitions associated with a mutex waiting thread.

15. One or more memory storage units comprising:
- software code that is executable by a processor to generate a plurality of adaptive partitions that are each associated with a plurality of process threads, where each of the plurality of adaptive partitions has a corresponding processor budget and the process threads comprise
- a mutex holding thread associated with a first adaptive partition of the plurality of adaptive partitions, where the mutex holding thread operates to gain exclusive access to a mutex object,
- a mutex waiting thread associated with a second adaptive partition of the plurality of adaptive partitions, where the mutex waiting thread waits for access to the mutex object when the mutex object is held by the mutex holding thread; and
- a scheduling system forming part of the software code, where the scheduling system selectively allocates the processor to run the process threads based, at least in part, on the processor budget of the associated adaptive partitions, and where the scheduling system operates to determine which of the mutex waiting threads is most likely to be run next on the processor upon release of the mutex object by the mutex holding thread and bills processor allocation used to run the mutex holding thread to the processor budget of the adaptive partition associated with the mutex waiting thread that is most likely to run next on the processor upon release of the mutex object by the mutex holding thread when the processor budget of the first adaptive partition has been exhausted; and
- where the scheduling system bills processor allocation used to run the mutex holding thread to the processor budget of the second adaptive partition when the processor budget of the first adaptive partition has been exhausted.

16. The one or more memory storage units of claim 15, where the scheduling system bills processor allocation used to run one or more process threads working on behalf of the mutex holding thread to the processor budget of the first adaptive partition.

17. The one or more memory storage units of claim 15, and further comprising one or more further mutex waiting threads associated with one or more further adaptive partitions of the plurality of adaptive partitions, where the one or more further mutex waiting threads wait for access to the mutex object when the mutex object is held by the mutex holding thread.

18. The one or more memory storage units of claim 17, where the mutex waiting thread associated with the second adaptive partition is the process thread which, of all the mutex waiting threads, the scheduling system is most likely to run next upon release of the mutex object.

19. The one or more memory storage units of claim 15, where the scheduling system generates an ordering function value for each of the plurality of adaptive partitions associated with a mutex waiting thread, and where the scheduling system compares one or more of the ordering function values to one another to determine which, of all the mutex waiting threads, the scheduling system is most likely to run next upon availability of the mutex object.

20. The one or more memory storage units of claim 15, where the mutex holding thread has a first run priority level and the mutex waiting thread has a second run priority level that is higher than the first run priority level, and where the scheduling system raises the priority level of the mutex holding thread to the second priority level.

21. A system comprising:

a processor;

one or more memory storage units;

software code stored in the one or more memory storage units, where the software code is executable by the processor to generate a plurality of adaptive partitions that are each associated with a plurality of process threads, where each of the plurality of adaptive partitions has one or more corresponding scheduling attributes including a processor budget, and where the process threads comprise:

a mutex holding thread associated with a first adaptive partition of the plurality of adaptive partitions, where the mutex holding thread is configured to gain exclusive access to a mutex object, a plurality of mutex waiting threads associated with two or more further adaptive partitions of the plurality of adaptive partitions, where the mutex waiting threads wait for access to the mutex object when the mutex object is held by the mutex holding thread, where the software code further comprises a scheduling system executable by the processor for selectively allocating the processor to run the process threads based, at least in part, on the processor budget of the associated adaptive partitions, where the scheduling system operates to determine which of the waiting threads is most likely to be run next on the processor upon release of the mutex object by the mutex holding thread and bills processor allocation used to run the mutex holding thread to the processor budget of the adaptive partition associated with the waiting thread that is most likely to run next on the processor upon release of the mutex object by the mutex holding thread when the processor budget of the first adaptive partition has been exhausted.

\* \* \* \* \*